(12) United States Patent
Lichter et al.

(10) Patent No.: US 8,303,021 B2
(45) Date of Patent: Nov. 6, 2012

(54) DOOR EDGE PROTECTION DEVICE

(75) Inventors: Martin Lichter, Erftstadt (DE); Thomas Benderoth, Gummersbach (DE); Armando Lopes dos Santos, Cologne (DE)

(73) Assignee: Ford Global Technologies, LLC, Dearborn, MI (US)

( * ) Notice: Subject to any disclaimer, the term of this patent is extended or adjusted under 35 U.S.C. 154(b) by 162 days.

(21) Appl. No.: 12/325,592

(22) Filed: Dec. 1, 2008

(65) Prior Publication Data

US 2009/0140534 A1  Jun. 4, 2009

(30) Foreign Application Priority Data

Dec. 1, 2007  (DE) .................. 10 2007 057 936

(51) Int. Cl.
*B60J 5/00* (2006.01)
*B60R 13/00* (2006.01)
(52) U.S. Cl. ............... 296/146.6; 293/118; 293/119; 296/152; 49/460; 49/462
(58) Field of Classification Search .......... 293/118–119, 293/126, 128; 296/146, 152; 52/716.5, 716.6, 52/716.7, 64, 71; 49/462, 460
See application file for complete search history.

(56) References Cited

U.S. PATENT DOCUMENTS

| | | | | |
|---|---|---|---|---|
| 2,678,232 A * | 5/1954 | Barry | ............... | 49/462 |
| 3,879,895 A * | 4/1975 | Hinderks | ........... | 49/462 |
| 4,221,411 A | 9/1980 | Kawada | | |
| 4,839,991 A * | 6/1989 | Rathgeb | ........... | 49/462 |
| 2011/0283626 A1 | 11/2011 | Tensing | | |

FOREIGN PATENT DOCUMENTS

| | | |
|---|---|---|
| DE | 1988490 U | 6/1968 |
| DE | 9405958 | 9/1994 |
| DE | 19934404 | 11/2000 |
| DE | 10215903 | 10/2003 |
| DE | 102004031798 | 1/2006 |
| EP | 2065260 A2 | 6/2009 |
| WO | WO2005021305 | 3/2005 |

\* cited by examiner

*Primary Examiner* — Jeanette E. Chapman
(74) *Attorney, Agent, or Firm* — James Dottavio; Price Heneveld LLP

(57) ABSTRACT

A door edge protection device for a motor vehicle door which comprises a door edge protection member guided movably with respect to the door at at least two points lying one behind the other in a longitudinal direction of the door. The door edge protection member is driven via an eccentric lever mounted rotatably in the door.

27 Claims, 3 Drawing Sheets

DOOR EDGE PROTECTION DEVICE

CROSS-REFERENCE TO RELATED APPLICATION

This application claims priority to German Patent Application No. 102007057936.7 filed Dec. 1, 2007.

FIELD OF THE INVENTION

The present invention relates to a door edge protection device for motor vehicle doors.

BACKGROUND OF THE INVENTION

Door edge protection devices for motor vehicle doors have edge protection bodies which are arranged inside the door body in the vicinity of the opening door edge and, when the door is opened, pivot around the door edge and surround this, so that, when the door is opened further, the door edge is protected from bumps against adjacent vehicles or other obstacles, such as trees, walls, etc., so as not to be damaged.

Edge protection body devices of this type are disclosed, for example, in U.S. Pat. No. 4,221,411, DE 19934404, DE 10215903, DE 102004031798 and WO 2005/021305. These edge protection devices have the disadvantage that the edge protection body, when it is moved out of the position of rest with the door closed, executes predominantly a rotation of approximately 180° about an axis parallel to the door edge or parallel to the vehicle longitudinal axis when the door is then opened. However, since the door edge of a motor vehicle door is usually not designed to be straight, but curved, in the known devices the edge protection bodies cannot be designed with an elongate contour adapted to the edge contour, but, instead, can protect only a narrowly limited region of the edge. Furthermore, these are sometimes complicated structures taking up a large amount of space.

DE 9405958 U1 discloses an edge protection device in which the edge protection device is mounted twofold, the mounting which faces away from the door edge being a linear guide which at the same time serves for driving the edge protection device, while the mounting which faces the door edge takes place by means of an intermediate lever which is mounted on the door and which, during the forward/backward movement of the drive, causes a pivoting movement of the edge protection device about the door edge. The disadvantage of this is that the pivoting movement does not make it possible to move the edge protection device around the entire door edge, since, because of the linear drive, the intermediate lever can execute only a pivoting movement of less than 180°. However, it is necessary for the door edge to be surrounded in this way by the door edge protection member if the door edge is to be effectively protected, particularly in the case of sharp corners and edges against which the door is opened.

SUMMARY OF THE INVENTION

An aspect of the present invention is to provide a door edge protection device for a motor vehicle door which comprises a door edge protection member guided movably with respect to the door at at least two points lying one behind the other in a longitudinal direction of the door. The door edge protection member is driven via an eccentric lever mounted rotatably in the door.

These and other aspects, objects and features of the present invention will be understood and appreciated by those skilled in the art upon studying the following specification, claims and appended drawings.

DETAILED DESCRIPTION OF EMBODIMENT OF THE INVENTION

Figure 1A:
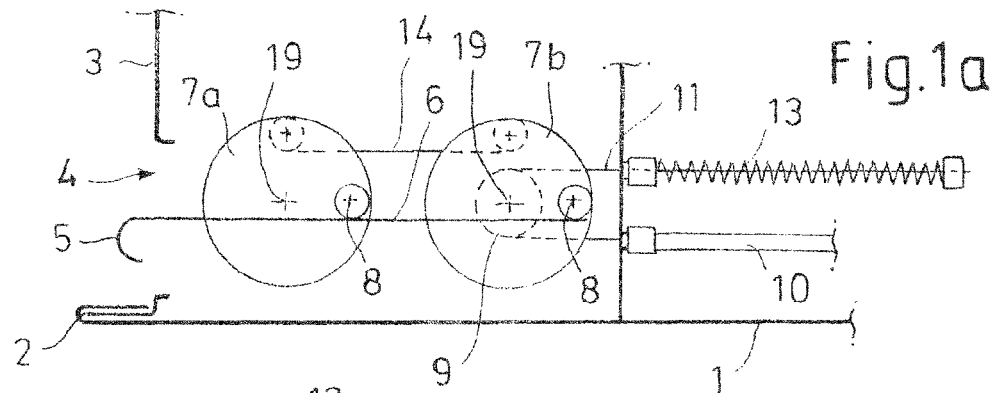
FIG. 1 shows a diagrammatic embodiment with two eccentric levers in four different movement phases (a), (b), (c) and (d)
Figure 1B:
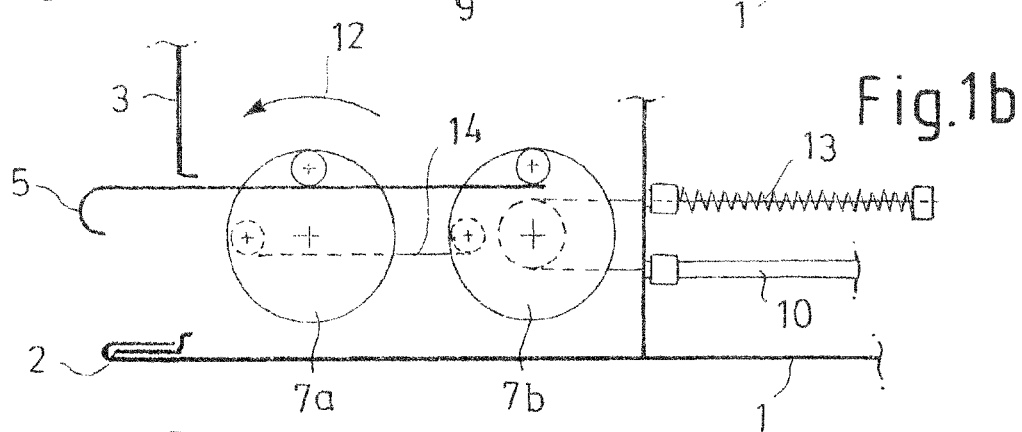
Figure 1C:
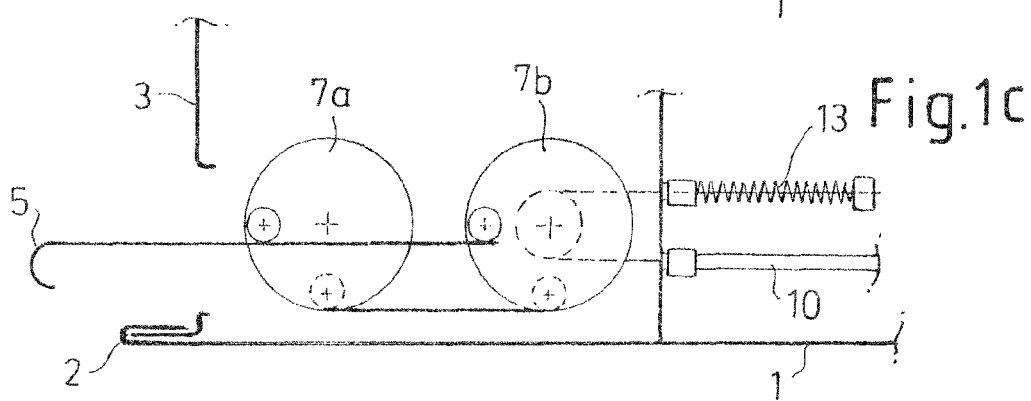
Figure 1D:
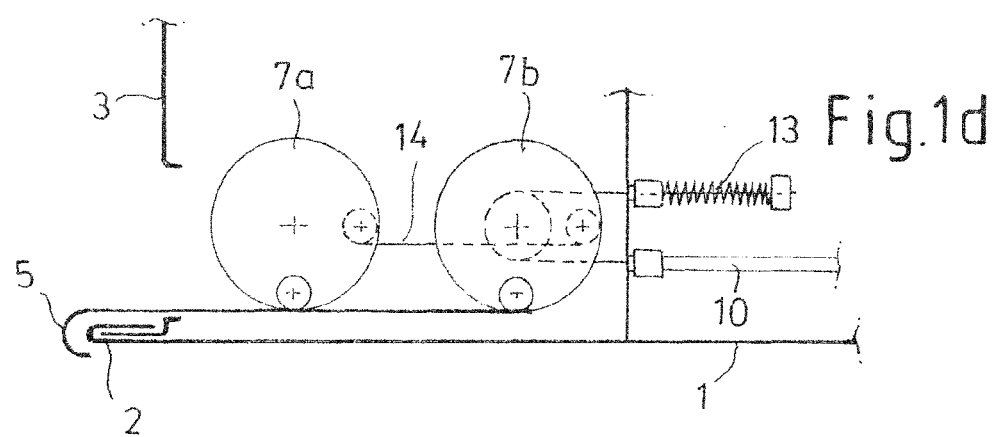

For purposes of description herein, the terms "upper," "lower," "right," "left," "rear," "front," "vertical," "horizontal," and derivatives thereof shall relate to the invention as orientated in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

According to an aspect of the present invention, since a door edge protection member is driven via an eccentric lever mounted rotatably in the door, the door edge protection member can move along a predetermined path in an essentially fixed spatial direction and predominantly in translation and can also at the same time execute a forward and backward movement for surrounding an outer door edge in a protection position.

According to an aspect of the present invention, the predominantly translational movement in an essentially fixed spatial direction arises from a twofold guidance of the door edge protection in the door at two points lying one behind the other in a longitudinal direction of the door. In this case, the longitudinal direction of the door is essentially an orientation parallel to an outside of the door and transverse to the door edge to be protected. Where a vehicle side door is concerned, the longitudinal direction corresponds approximately to the direction of travel, if the door is mounted on a column by hinges and the door edge to be protected lies opposite the hinges and runs approximately vertically. Where a tailgate is concerned, the longitudinal direction corresponds to the vertical (in the closed state) if the tailgate is mounted on the roof frame by hinges and the door edge to be protected is the lower edge of the tailgate. Where laterally fastened tailgates are concerned, the longitudinal direction would be horizontal transverse to the direction of travel if the vertical door edge of the tailgate is to be protected.

According to an aspect of the present invention, the forward and backward movement is generated in that the eccentric lever is rotated parallel to the longitudinal direction of the door beyond one end position. The rotary mounting of the eccentric lever in the door consequently results automatically, on the other side of the eccentric lever, in the forward and backward movement if this side drives the door edge protection member.

According to an aspect of the present invention, the door edge protection member can consequently be adapted to the contour of the door edge over a large portion of the door edge and nevertheless can both be accommodated in a space-saving way on or in the door and be moved in a space-saving way into the protection position. The door edge protection member according to an aspect of the invention protects the door edge over a far larger region than previous protection devices and yet requires only a small installation space.

According to an aspect of the present invention, during the outward movement itself, the space required for the movement is likewise limited to a minimum, since the predominantly translational movement arising from the twofold guidance of the door edge protection member makes it possible to have a short movement travel required to move the door edge protection member from the position of rest into the protection position.

According to an aspect of the present invention, the door edge protection member can be guided on the door by the eccentric lever. The eccentric lever then assumes the task of guiding and driving the door edge protection member. In this case, the connection between the door edge protection member and eccentric lever can be made via an eccentric bolt. The door edge protection member then essentially follows the rotational movement of the eccentric lever, but does not itself rotate, instead experiencing, as a resultant movement, a pivoting movement which is dependent on a second guide and which is advantageously guided around the door edge.

According to an aspect of the present invention, normally, the eccentric lever executes a rotational movement of at least 180° and at most 360°. The 180° is in order to obtain the forward and backward movement which is required for surrounding the door edge in the protection position. A larger angle of rotation of the eccentric lever than 360° is expedient if the door edge protection member has two guides which, despite the full rotation of the eccentric lever, bring the door edge protection member from the position of rest into the protection position. The angle of rotation can be between 250° and 290°, particularly when the eccentric lever also assumes the front guidance of the door edge protection member. In this context, "front guidance" means the guide which lies nearer to the door edge to be protected than the second guide lying behind it in the longitudinal direction, here called "rear guidance." The door edge protection member can consequently be moved out of the position of rest on or in the door into the protection position around the door edge.

According to an aspect of the present invention, the door edge protection member is guided by two eccentric levers arranged one behind the other in the longitudinal direction of the vehicle. The pivoting movement of the door edge member into the protection position is then obtained in a very simple way if the two eccentric levers are transmission-coupled. If there is a direct transmission coupling without a step-up or step-down and if the geometry of the coupling to the door edge member is identical for both eccentric levers, the simultaneous rotation of the two eccentric levers causes a purely parallel translational displacement of the door edge protection member.

According to an aspect of the present invention, if this identical design of the eccentric levers is dispensed with, then, depending on the transmission coupling and the arrangement of the eccentric bolts, a slight rotation of the door edge protection member is brought about in addition to the translational movement. The two eccentric levers consequently allow a broad adaption of the pivoting movement of the door edge protection member, so that the door edge protection member reaches the protection position as quickly and as reliably as possible. If the two eccentric levers are not identical, a connection of the eccentric bolts to the door edge protection member must have play, so that a transmission blockage of the eccentric levers and door edge protection member does not occur.

According to an aspect of the present invention, the transmission coupling of the two eccentric levers may take place via a gearwheel transmission, in that the two eccentric levers are connected fixedly to a gearwheel and these two gearwheels are, in turn, transmission-connected via at least one intermediate gearwheel. In this case, depending on the number of teeth, a uniform movement of the two eccentric levers or a reciprocally stepped-down or stepped-up rotational movement of the eccentric levers can take place. Instead of an intermediate gearwheel, a rack may also perform this coupling and may also serve at the same time as the drive.

According to an aspect of the present invention, the two eccentric levers are transmission-coupled via a driving rod. This allows a simple mechanical coupling of the two eccentric levers, while the movement of the two eccentric levers can be coupled uniformly, thus bringing about an approximately translational movement of the door edge protection member. An additional rotational movement of the door edge protection member can be generated in that the driving rod is arranged with different radii and/or different angles in relation to the eccentric levers.

For the drive of the eccentric lever, there are many possible versions, some advantageous ones of which are described below. These examples are not complete, on the contrary all drives are suitable which apply a torque to the eccentric lever and consequently cause a rotation of the latter.

According to an aspect of the present invention, the eccentric lever can have an eccentric shaft on which the drive acts. The drive can then be applied to the eccentric lever from a position which may also be mounted outside the movement mechanism.

According to an aspect of the present invention, the drive of the eccentric lever may take place via a rack which acts on a gearwheel connected to the eccentric lever. In this case, the gearwheel may also be connected to the eccentric lever via an eccentric shaft. The drive may also take place directly to this gearwheel by means of a suitable actuator, motor, etc.

According to an aspect of the present invention, in one possible version, the eccentric lever or the eccentric shaft is driven via a push rod and/or a Bowden cable.

According to an aspect of the present invention, the eccentric lever may also be driven, both on the eccentric shaft and at any other point, by an electric motor. The electric motor may in this case also bring about the drive to the eccentric lever via the abovementioned drive variants, for example the gearwheel.

The drives described here constitute particularly advantageous versions. It will be appreciated that the drive of the door edge protection member may take place by means of all other suitable actuators, that is to say pneumatic, electric, hydraulic or mechanical actuators. A mechanical actuator may, for example, utilize the door opening movement as drive energy, as is described further below as an exemplary drive unit. Furthermore, the actuators may act in any suitable way on the eccentric lever directly or indirectly, for example via Bowden cables, push rods, an eccentric shaft, etc.

According to an aspect of the present invention, the door edge protection member is driven counter to a spring which undergoes tension. Consequently, only one drive in one direction is necessary, for example in order to move the door edge protection member into the protection position. During the closing of the door, the door edge protection member is moved by means of the resultant spring force and is moved into the position of rest.

According to an aspect of the present invention, the spring may act on the eccentric shaft in that the rotation of the eccentric shaft is stored as torsion energy in the spring. This makes it possible to have a highly compact arrangement of the spring.

According to an aspect of the present invention, the door edge protection member, during its movement, is guided by at least one slotted assembly, for example by two slotted assemblies. Slotted guides likewise allow a predominantly translational displacement of the door edge protection member out of the position of rest into the protection position. Owing to the drive by means of the eccentric lever, the door edge protection member can also execute the surrounding movement, predetermined by the slotted assembly, around the door edge. If, for example, there are two slotted assemblies present, if appropriate, a coupling having play between the eccentric lever and door edge protection member is expedient, specifically in such a way that the drive in the slotted assembly is ensured and nevertheless no warping between the components occurs.

According to an aspect of the present invention, the door edge protection member, during its movement, may be guided by a sliding guide fixed in the door. This is particularly advantageous in conjunction with an above-described eccentric and/or slotted guide. Consequently, at one end, the door edge protection member can be guided uniformly in the door, while, at the other end, the door edge protection member experiences the required pivoting movement by means of the eccentric lever and/or the slotted assembly.

According to an aspect of the present invention, the door edge protection member may be guided inside the door on an eccentric lever by means of a hinge. In this case, a change in the spatial direction of the door edge protection member in a horizontal plane of up to 20° about a sliding guide fixed in the door can be taken into account. A particularly beneficial configuration is achieved in that the first guide by means of the eccentric lever inside the door is arranged further away from the protection member, and the second guide by means of a sliding guide is arranged in the vicinity of the end-face issue from the door case. In this instance, the transverse movement of the door edge protection member is minimal, and therefore the orifice of the door case can have a minimal configuration.

According to an aspect of the present invention, in the version with a sliding guide, the door edge protection member may have a bent sliding rail which is mounted in the sliding guide and which, by virtue of the bent shape, assists the above-described pivoting movement resulting from the slotted and/or eccentric guide.

According to an aspect of the present invention, the door edge protection member is guided by a sliding rod, in that the door edge protection member and sliding rod are connected in an articulated manner and the sliding rod is mounted in the door so as to be predominantly longitudinally displaceable. This type of guide is known, for example, from DE 9405958 U1. Advantageously, in this instance, rear guidance is carried out by means of the sliding rod, while front guidance takes place by means of an eccentric lever or slotted assembly.

According to an aspect of the present invention, the door edge protection member comprises an elastic holding rod. The door edge protection member can then execute an elastic reversible movement with respect to the guides, without being damaged. Particularly when the outward movement of the door edge protection member is blocked by an obstacle, damage to the door edge member and/or to the mechanism of the protection device is prevented.

According to an aspect of the present invention, a similar action is achieved when the door edge protection member is fastened releasably in the region of the holding rod. Then, in the event of an overload which acts on the door edge protection member during the outward movement, for example due to a blockage, the door edge protection member can be released from the mechanism of the protection device. Advantageously, this releasable connection is configured such that, after release, the door edge protection member can be connected to the mechanism again without further aids. This may be implemented, for example, in that the holding rod is of two-part design, and that part of the holding rod which is connected to the mechanism clamps with a certain prestress that part of the holding rod which is connected to the door edge protection member. This clamping causes the two parts to be released from one another in the event of overload. Thereafter, the two parts are clamped one in the other again with little effort and without a tool.

According to an aspect of the present invention, the protection device can comprise a drive unit which is controlled by the degree of opening of the door. In this case, the control and/or the drive may take place mechanically, electrically/electronically, pneumatically or by means of other suitable controls/actuators. The task of the drive unit is in this case to provide a drive even at the earliest possible point in time during the opening of the door, that is to say in the case of the smallest possible opening angle of the door, in order to move the door edge protection member into the protection position as quickly as possible. This is expedient because the door edge is still to be protected even in the case of small door opening angles, for example when parking gaps are narrow or when the vehicle is parked very closely to a wall, etc., and a vehicle occupant opens the door carelessly.

According to an aspect of the present invention, the protection device can comprise a drive unit for driving the eccentric lever, said drive unit being controlled by the degree of opening of the door. A relationship is consequently made directly between the door opening angle and the movement of the door edge protection member out of the position of rest into the protection position.

The drive unit can provide the drive between a first door opening angle and a second door opening angle, in which case the first door opening angle should amount to between 0° and 15°, in particular 4° and 6°, and the second door opening angle should amount to between 12° and 30°, in particular 14° and 16°. The door edge protection member commences its pivoting movement when the first door opening angle is reached and ends the pivoting movement when the second door opening angle is reached, so that the door edge is protected over a broad angular range during further opening.

FIG. 1 indicates diagrammatically the door outer panel 1 with the door edge 2 to be protected and with the end face 3 of the door. The end face 3 has an orifice 4 through which the door edge protection member 5 projects. When the door is closed (FIG. 1(*a*)), the door edge protection member 5 is concealed by the door edge 2 as seen from outside. The door edge protection member 5 has a holding rod 6 connected to eccentric levers 7*a* and 7*b* via eccentric bolts 8. The eccentric levers 7*a* and 7*b* are mounted rotatably in the door via an eccentric shaft 19. Via a driving rod 14 arranged at 90° with respect to the eccentric levers 7*a*, 7*b*, further transmission connection of the two eccentric levers 7*a*, 7*b* is made, in order to overcome the dead center of the eccentric lever 7*a*, itself not driven, in the positions according to FIGS. 1(a) and 1(d). This ensures that the eccentric levers 7a, 7b rotate uniformly at all angles of rotation. By virtue of this arrangement, the door edge protection member 5 executes a translational pivoting movement, without appreciably varying its direction in space.

Below the eccentric lever 7b is located a rope drum 9, by means of which the eccentric lever 7b is driven by means of a Bowden cable 10. The eccentric lever 7b is driven or moved by the Bowden cable 10 in one direction and in the opposite direction by a spring 13. A pull on the Bowden cable 10 causes the eccentric lever 7b to be rotated in the direction of arrow 12. A rope 11 loops around the rope drum 9 and acts with its end on a spring 13. When the Bowden cable 10 pulls and rotates the rope drum 9, the spring 13 is simultaneously tensioned via the rope 11 which is wound up. When the pull in the Bowden cable 10 diminishes, the spring 13 pulls the rope 11 and consequently the eccentric lever 7b back into the initial position again.

The drive, dependent on the degree of opening of the door, for the Bowden cable 10 is set up such that a pull on the Bowden cable 10 occurs only after the door has opened over an angle of 0 to 15°. When the door is opened further, the edge protection member 5 passes through the phases illustrated in FIGS. 1(b) and (c). In the position shown in FIG. 1(d), the edge protection member 5 has reached its end position in which it surrounds the door edge 2. The drive dependent on the degree of opening of the door is set up such that this position is reached at a door opening angle of 12 to 30°, and an additional pull is no longer exerted on the Bowden cable 10 during the further opening of the door.

Figure 2:
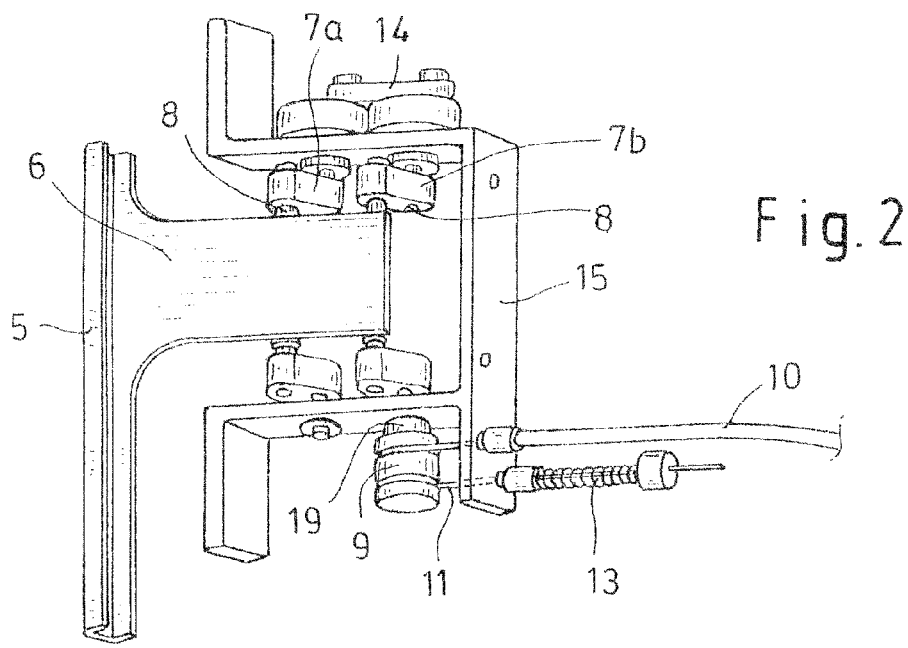
FIG. 2 shows a perspective view of a version of the invention according to FIG. 1.

FIG. 2 shows a perspective view of a version of the embodiment of invention according to FIG. 1, the elements described being arranged in a mounting frame 15 and the door itself not being illustrated.

Figure 3:
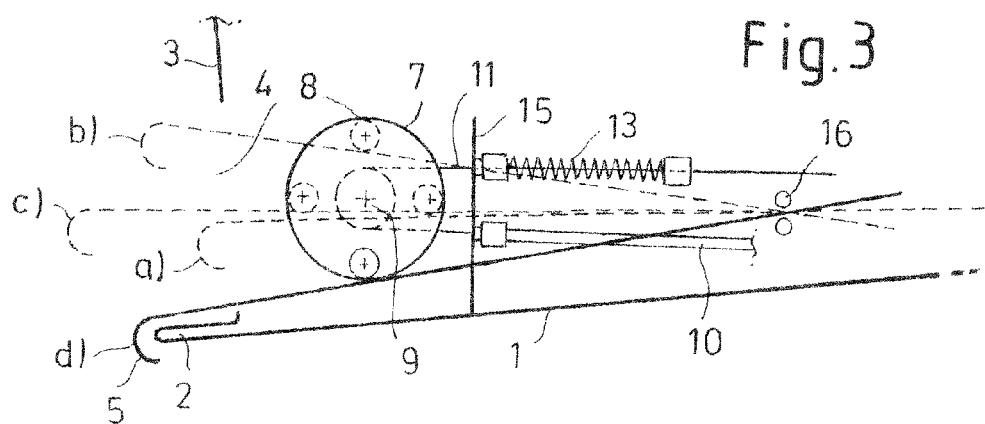
FIG. 3 shows a diagrammatic embodiment with an eccentric lever and with a sliding guide.

FIG. 3 shows an alternative embodiment of the invention, in which only one eccentric lever 7 is provided as front guidance and the other eccentric lever is replaced as rear guidance by a sliding guide 16. The movement phases (a), (b) and (c) of the door edge protection member 5 according to FIG. 1 are illustrated by dashes. The edge protection member describes a slightly elliptic path, with a slight variation in spatial orientation taking place.

Figure 4:
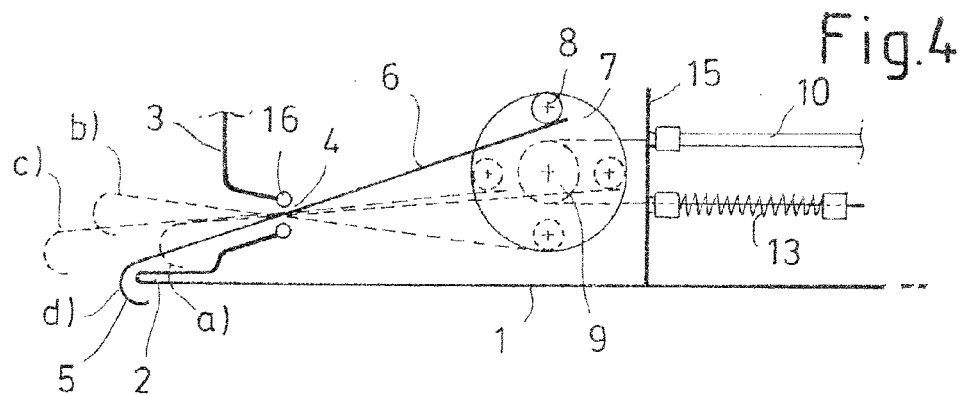
FIG. 4 shows a further diagrammatic embodiment with an eccentric lever and with a sliding guide.
Figure 5A:
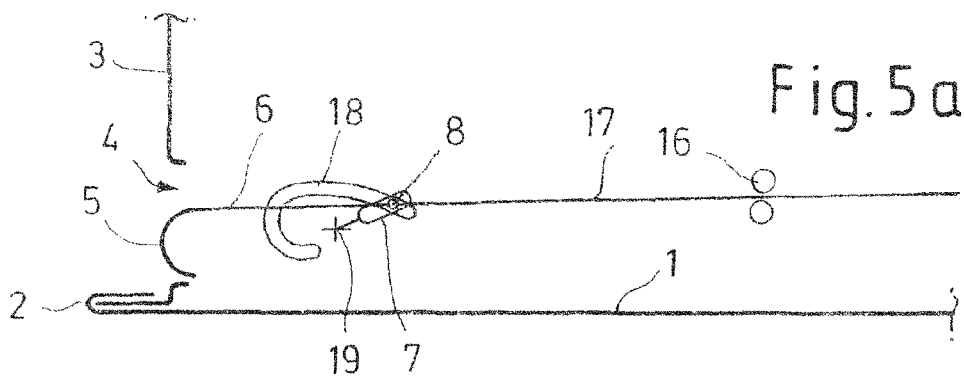
FIG. 5 shows a diagrammatic embodiment with an eccentric lever and with a slotted guide in four different movement phases (a), (b), (c) and (d).
Figure 5B:
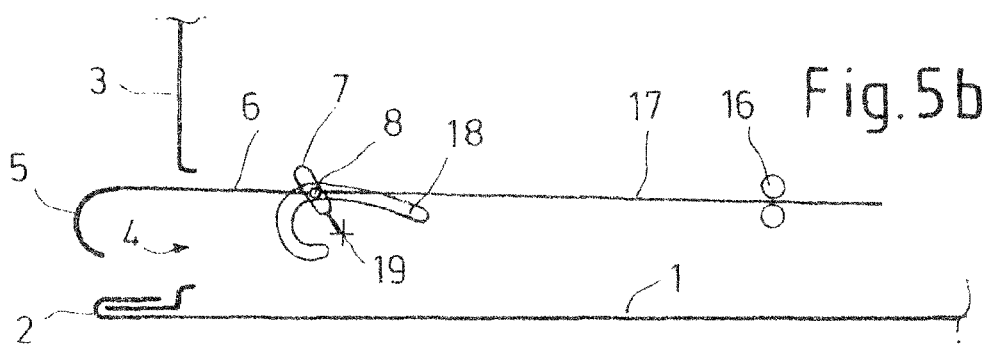
Figure 5C:
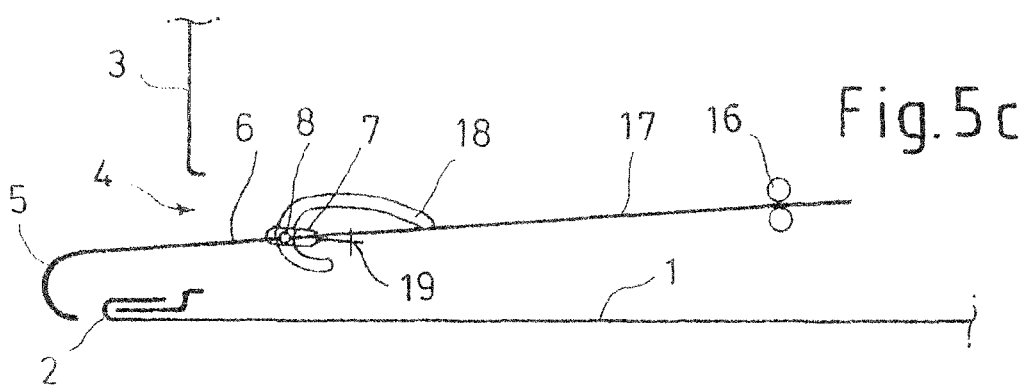
Figure 5D:
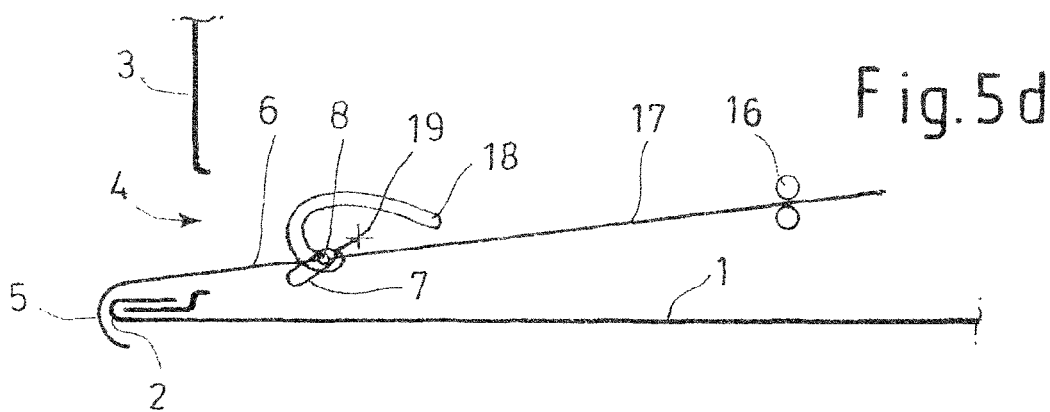

FIG. 4 shows a further alternative embodiment, similar to that according to FIG. 3, with the sliding guide 16 being arranged at the orifice 4 on the end face 3 of the door case as front guidance and the eccentric lever 7 being arranged on the inside in the door case as rear guidance.

The diagrammatic embodiment shown in FIG. 5 in four different movement phases (a), (b), (c) and (d) has a slotted assembly 18 as front guidance and a sliding guide 16 as rear guidance. The door edge protection member 5 is guided in the slotted assembly 18 by means of the eccentric bolt 8 and in the sliding guide 16 by means of a sliding rail 17. The drive takes place via the eccentric lever 7 mounted on an eccentric shaft 19. So that no mechanical blockage occurs, the eccentric bolt 8 is mounted in a radial slot in the eccentric lever 7, so that the different distances of the eccentric bolt 8 from the eccentric shaft 19 which arise from the guidance of the slotted assembly 18 can be compensated, in that the eccentric bolt 8 is displaced radially in the slot of the eccentric lever 7.

In FIG. 5, the door edge protection member 5 is first in the position of rest (a). As a result of the rotation of the eccentric lever 7, the door edge protection member 5 is moved into the protection position (d) via the positions (b) and (c). The slotted guide 16 allows a highly space-saving movement of the door edge protection member 5 out of the position of rest into the protection position, and the drive via the eccentric lever 7 makes it possible for the door edge 2 to be surrounded by the door edge protection member 5, in that the backward movement in the slotted assembly between positions (c) and (d) is made possible.

The invention claimed is:

1. A door edge protection device for a motor vehicle door comprising:
    a door edge protection member guided movably with respect to the door at at least two points lying one behind the other in a longitudinal direction of the door, wherein the door edge protection member is driven via a lever mounted rotatably in the door and wherein the lever is driven by a cable in one direction and in an opposite direction by a spring to execute a rotational movement of at least 180° to move the door edge protection device.

2. The protection device as claimed in claim 1, wherein the door edge protection member is guided on the door by the lever.

3. The protection device as claimed in claim 2, wherein the lever executes a rotational movement of at least 180° and at most 360°.

4. The protection device as claimed in claim 1, wherein the door edge protection member is connected to two levers at the two points, with the two levers arranged one behind the other in the longitudinal direction of the door.

5. The protection device as claimed in claim 4, wherein the two levers are transmission-coupled.

6. The protection device as claimed in claim 5, wherein the two levers are transmission-coupled via a gearwheel transmission.

7. The protection device as claimed in claim 5, wherein the two levers are transmission-coupled via gearwheels and a rack.

8. The protection device as claimed in claim 1, wherein the lever is driven by an eccentric shaft thereon.

9. The protection device as claimed in claim 1, wherein the lever is driven by a rack which acts on a gearwheel connected to the lever.

10. The protection device as claimed in claim 1, wherein the lever is driven by a push rod or a Bowden cable.

11. The protection device as claimed in claim 1, wherein the lever is driven by an electric motor.

12. The protection device as claimed in claim 1, wherein the door edge protection member is driven counter to a spring which undergoes tension.

13. The protection device as claimed in claim 12, wherein the lever has an eccentric shaft and the spring acts on the eccentric shaft.

14. The protection device as claimed in claim 1, wherein the door edge protection member is guided by at least one slotted assembly.

15. The protection device as claimed in claim 14, wherein the door edge protection member is guided by two slotted assemblies.

16. The protection device as claimed in claim 1, wherein the door edge protection member is guided by a sliding guide fixed in the door.

17. The protection device as claimed in claim 16, wherein the door edge protection member has a bent sliding rail which is mounted in the sliding guide.

18. A door edge protection device for a motor vehicle door comprising:
    a door edge protection member guided movably with respect to the door at at least two points lying one behind the other in a longitudinal direction of the door, wherein the door edge protection member is driven via a lever mounted rotatably in the door and wherein the lever executes a rotational movement greater than 90°, wherein the door edge protection member comprises an elastic holding rod and the door edge protection member is fastened releasably in a region of the holding rod.

19. The protection device as claimed in claim 1, further including a drive unit for driving the lever, the drive unit being controlled by a degree of opening of the door.

20. The protection device as claimed in claim 19, wherein the drive unit moves the door edge protection member between a first door opening angle and a second door opening angle.

21. The protection device as claimed in claim 20, the first door opening angle being between 0° and 15° and the second door opening angle being between 12° and 30°.

22. The protection device as claimed in claim 1, wherein the door edge protection member slides through and pivots about at least one of the at least two points.

23. A door edge protection device for a motor vehicle door comprising:
a door edge protection member guided movably with respect to the door via a sliding guide and a lever mounted rotatably in the door, wherein the door edge protection member is driven via the lever, and wherein the lever is driven by a cable in one direction and in an opposite direction by a spring to execute a rotational movement of at least 180°.

24. The protection device as claimed in claim 23, wherein the lever is behind the sliding guide generally in a longitudinal direction of the door.

25. The protection device as claimed in claim 23, wherein the lever has an eccentric shaft.

26. A door edge protection device for a motor vehicle door comprising:
a door edge protection member guided movably with respect to the door at at least two points lying one behind the other, wherein the door edge protection member is driven via a lever mounted rotatably in the door, and wherein the lever is driven by a rack acting on a gearwheel connected to the lever, wherein the lever is driven by a cable in one direction and in an opposite direction by a spring to execute a rotational movement of at least 180° to move the door edge protection device.

27. A door edge protection device for a vehicle door comprising:
a door edge protection member guided movably with respect to the door at at least two points lying one behind the other in a longitudinal direction of the door and driven via a lever driven by a cable in one direction and a spring in an opposite direction to execute a rotational movement of at least 180° to move the door edge protection device.

* * * * *